(12) United States Patent
Horiuchi et al.

(10) Patent No.: US 9,161,552 B2
(45) Date of Patent: *Oct. 20, 2015

(54) PROCESS FOR PRODUCING FERMENTED MILK AND FERMENTED MILK

(75) Inventors: Hiroshi Horiuchi, Odawara (JP); Nobuko Inoue, Odawara (JP); Naoki Orii, Odawara (JP)

(73) Assignee: Meiji Co., Ltd., Tokyo (JP)

( * ) Notice: Subject to any disclaimer, the term of this patent is extended or adjusted under 35 U.S.C. 154(b) by 2654 days.

This patent is subject to a terminal disclaimer.

(21) Appl. No.: 11/570,356

(22) PCT Filed: Jun. 10, 2005

(86) PCT No.: PCT/JP2005/011089
§ 371 (c)(1), (2), (4) Date: Dec. 11, 2006

(87) PCT Pub. No.: WO2005/120240
PCT Pub. Date: Dec. 22, 2005

(65) Prior Publication Data
US 2007/0224314 A1    Sep. 27, 2007

(30) Foreign Application Priority Data
Jun. 14, 2004 (JP) ................................. 2004-176185

(51) Int. Cl.
A23C 9/127 (2006.01)
A23C 9/12 (2006.01)
A23C 9/13 (2006.01)

(52) U.S. Cl.
CPC ........... *A23C 9/1307* (2013.01); *A23C 2240/20* (2013.01)

(58) Field of Classification Search
CPC ......................... A23C 9/1307; A23C 2240/20
USPC ........................................ 426/43, 34, 583, 61
See application file for complete search history.

(56) References Cited

U.S. PATENT DOCUMENTS

| 1,866,184 | A |   | 7/1932  | Wehsarg |       |
|-----------|---|---|---------|---------|-------|
| 5,453,286 | A | * | 9/1995  | Castberg et al. | 426/43 |
| 5,962,046 | A |   | 10/1999 | Eyer et al. |   |
| 2006/0040016 | A1 | | 2/2006 | Horiuchi et al. |  |

FOREIGN PATENT DOCUMENTS

| DE | 196 17 521 A1 | 12/1997 |       |
|----|---------------|---------|-------|
| DE | 197 36 643 A1 | 2/1999  |       |
| EP | 0 322 010 A1  | 6/1989  |       |
| EP | 0 855 140 A1  | 7/1998  |       |
| EP | 0 855 140 B1  | 7/1998  |       |
| EP | 1 082 907 A2  | 3/2001  |       |
| FR | WO 0224870 *  | 3/2002  | C12N 1/28 |
| JP | 1 257476      | 10/1989 |       |
| JP | 1-257476      | 10/1989 |       |
| JP | 6-327401      | 11/1994 |       |
| JP | 9-201164      | 8/1997  |       |
| JP | 10 99019      | 4/1998  |       |
| JP | 10-99019      | 4/1998  |       |
| JP | 10-155420     | 6/1998  |       |
| JP | 10-201415     | 8/1998  |       |
| JP | 10-327751     | 12/1998 |       |
| JP | 11-28056      | 2/1999  |       |
| JP | 11-75688      | 3/1999  |       |
| JP | 11-113520     | 4/1999  |       |
| JP | 11 113520     | 4/1999  |       |
| JP | 2001-112437   | 4/2001  |       |
| JP | 2002-191294   | 7/2002  |       |
| JP | 3644505       | 2/2005  |       |
| JP | 3666871       | 6/2005  |       |
| JP | 2005-176603   | 7/2005  |       |
| JP | 2005-348703   | 12/2005 |       |
| WO | WO 97/34496   | 9/1997  |       |
| WO | 2004 049812   | 6/2004  |       |

OTHER PUBLICATIONS

JP-10-099019. Machine Translation.*
JP-10-099019—Official Translation.*
S. Shekar, et al., "Influence of Dissolved Oxygen on Acid Production in Buffalo Milk by Lactic Cultures", Journal of Food Protection, vol. 46, No. 4, Apr. 1983, pp. 321-324.
U. Grupa, "Technische Gase", Käseherstellung, XP000822827, vol. 120, No. 7, Apr. 8, 1999, pp. 275-281.
Rage A, et al., "Vacuum treatment of milk used to produce cultured milk products", International Food Information Service, Database FSTA [Online], Databese Accession No. 87-1-04-p0169, No. 19, vol. 73, XP-002536379, Jan. 1, 1984, 1 page.
R. R. Shaker, et al., "Rheological properties of set yogurt as influenced by incubation temperature and homogenization", Journal of Food Quality, vol. 25, XP-002533642, 2002, pp. 409-418.
A. Y. Tamime, et al., "Yogurt: Technology and Biochemistry", Journal of Food Protection, vol. 43, No. 12, XP-0080199998, Dec. 1, 1980, pp. 939-977.

* cited by examiner

*Primary Examiner* — Hamid R Badr
(74) *Attorney, Agent, or Firm* — Oblon, McClelland, Maier & Neustadt, L.L.P.

(57) ABSTRACT

An object of the present invention is to provide a method for producing a fermented milk, in which fermentation is accelerated without using a fermentation accelerator or the like and a novel fermented milk obtained by the production method having a hard texture that does not collapse during the distribution stage while having thickness and mildness which are not exhibited by conventional products. As a result of study, it was found that the fermentation efficiency can be improved by reducing the oxygen dissolved in a raw material mix of the fermented milk at the start of fermentation through replacement thereof with an inert gas, and that fermentation in that condition at usual temperature leads to a method for producing a fermented milk by which the fermentation time is shortened thereby to improve the productivity, and fermentation at a temperature lower than usual leads to a method for producing a fermented milk by which a novel fermented milk that has a thick and mild taste superior to that of a fermented milk with a mild taste produced through conventional low-temperature and long-term fermentation and also has a hard texture that does not collapse during the distribution stage is obtained in usual fermentation time, and leads to such a fermented milk produced by the method. Thus the invention has been completed.

21 Claims, 3 Drawing Sheets

PROCESS FOR PRODUCING FERMENTED MILK AND FERMENTED MILK

TECHNICAL FIELD

The present invention relates to a method for producing a novel fermented milk, in which fermentation is accelerated without using a fermentation accelerator or the like and a novel fermented milk obtained by the production method.

BACKGROUND ART

Fermented milk is a paste or liquid product obtained by fermenting milk, or a milk product, etc. containing solid contents of nonfat milk at the same level or higher than milk, with lactic acid bacteria or yeast, or a frozen product thereof, and is broadly classified into two types. One is a pre-fermentation type, and the other is a post-fermentation type. The former is produced by packing into an individual container for distribution the fermented milk crushed after the completion of fermentation and cooling in a tank before packing into the container. The latter is produced by packing a raw material mix for fermented milk with the addition of a predetermined amount of a starter (hereinafter referred to as a mix) into an individual container for distribution such as a paper container, and subsequently fermenting the mix in a fermentation chamber until the lactic acid acidity reaches a predetermined level for solidification into a pudding-like state, followed by cooling. The pre-fermentation is commonly used for producing fruit yogurt with fruit flesh, drinking yogurt and the like, while the post-fermentation is commonly used for producing yogurt of so-called hard-type and plain-type, and the like.

In either case of the fermentation types, a starter is added to a sterilized mix at a predetermined temperature, and fermentation is carried out until the acidity reaches a predetermined level in the fermentation process. Then, the resulting product is cooled for terminating the fermentation to prepare a final product. Because the fermentation temperature and fermentation time at this step not only affect the production efficiency of the product but also significantly affect the taste and quality, it is necessary to set the fermentation temperature and the fermentation time appropriately with taking those effects into account. For example, the fermentation temperature should be set lower in the case where it is intended to give a mild taste to the product.

What is problematic here is that, for example in the case where the fermentation temperature is set lower to give a mild taste to the product, problems arise in the production efficiency and product quality, for example, the fermentation time required to reach a predetermined acidity is significantly prolonged compared with a usual method, the texture hardness is so low that the product collapses during the distribution process and so on. Accordingly, the present situation is that it is difficult to obtain a fermented milk having a mild taste and a texture with a hardness that does not collapse during the distribution process without prolonging the fermentation time.

No direct method for improving such a present situation has been reported yet. However, the following approaches have been conventionally carried out as applicable methods. A first approach is a method of adjusting conditions in which the efficiency of fermentation process is improved to shorten the fermentation time. It is considered that such an approach enables fermentation at a fermentation temperature lower than usual in addition to the achievement of the object of improving the production efficiency. A second approach is a method of selecting a lactic acid bacterium which produces a substance giving a mild taste. A third approach includes a method of not devising the fermentation process but giving a necessary texture such as mildness by adding an additive for improving the taste to the product.

As the first method for accelerating fermentation, a method of adding a milk protein concentrate (JP-A-11-028056), a method of adding a butter milk (JP-A-09-201164) and the like have been proposed. However, in these prior examples, low-temperature fermentation was not assumed, and it was not mentioned whether or not fermentation can be accelerated at a low temperature.

As the second method, a method of giving a fresh and mild taste to a fermented milk by fermentation in which a lactic acid bacterium to be used is selected so as to make L-lactic acid account for 85% or more of the total lactic acid (JP-A-06-327401) has been proposed.

As the third method, a method of improving the taste by adding an amino acid having a specific composition to a resulting fermented milk (for example, JP-A-10-327751) has been proposed.

Any of these methods involves the addition of some substance to a fermented milk or the modification of the composition of the components thereof. Therefore, it is inevitable to design the product in consideration of the effects of additives and the like on the product's taste, quality and the like. In other words, these methods can neither improve production efficiency while maintaining the product feature of the original product without using additives and the like, nor add a "mild taste" to the product while maintaining the production efficiency and the product feature of the original product.

As the method of giving the fermented milk a hardness that does not allow the texture to collapse during transportation or the like, there is a report describing that because the texture softens when a fermented milk is produced by adding peroxidase, the texture can be prevented from softening by reducing the dissolved oxygen concentration (JP-A-10-099019).

In this case, the description on fermentation temperature including the case of generally performing fermentation at a low temperature can be found, however, there is no suggestion that fermentation time is shortened when dissolved oxygen is reduced or a fermented milk with a smooth texture and an unprecedented taste can be obtained by carrying out fermentation at a lower fermentation temperature for a shorter time compared with the case where the dissolved oxygen concentration is not reduced. As a matter of course, the invention in this case relates to a method for improving a fermented milk to which peroxidase was added, and does not relate to a fermented milk in which an additive that affects the texture is not contained as the case of obtaining a hard yogurt of the method of the present invention.

DISCLOSURE OF THE INVENTION

An object of the present invention is to provide a method for producing a fermented milk in which fermentation is accelerated without adding any fermentation accelerator or the like to shorten the fermentation time thereby improving the productivity. Further, another object of the present invention is to provide a method for producing a fermented milk, by which fermentation can be carried out at a temperature lower than the conventional temperature without almost any prolongation of fermentation time so that a novel fermented milk product can be obtained, which have never been obtained conventionally, and a novel fermented milk obtained by the production method, and the present invention has been achieved.

The present inventors made dedicated investigations to achieve the above-mentioned objects. As a result, they found that, in the production process of a fermented milk, the rate of increase in lactic acid acidity was accelerated by carrying out fermentation in conditions that the dissolved oxygen concentration in the mix at the start of fermentation was reduced although any additive such as a fermentation accelerator was not used, so that the time required to reach the acidity for the termination of fermentation could be greatly shortened. Thus, the first object has been achieved.

Further, the inventors found that, when fermentation was carried out at a fermentation temperature lower than usual in conditions that the dissolved oxygen concentration in the mix was reduced, the lactic acid acidity of the mix could reach the acidity for the termination of fermentation within a fermentation time almost equal to the fermentation time in the case of carrying out fermentation at a usual fermentation temperature.

Additionally, the inventors found that the fermented milk obtained in such a manner turned out to be a novel fermented milk with a hard texture that does not collapse during the distribution process, which has never been achieved in products produced by conventional low-temperature and long-term fermentation, although the fermented milk has a thick and mild taste superior to the mild taste exhibited by a fermented milk produced through conventional low-temperature and long-term fermentation. Thus, the second object has been achieved.

In other words, in the present invention, it was found that the fermentation efficiency is improved by reducing the dissolved oxygen concentration in the mix at the start of fermentation in the production process of a fermented milk, and the feature can be directed to shortening of the fermentation time or lowering of the fermentation temperature to below the usual temperature, and as a result, an unprecedented novel fermented milk can also be brought about.

That is, fermentation at usual temperature in conditions that the dissolved oxygen concentration in the mix is reduced leads to an invention relating to a method for producing a fermented milk by which the fermentation time is shortened thereby to improve the productivity, and fermentation at a temperature lower than usual in conditions that the dissolved oxygen concentration in the mix is reduced leads to an invention relating to a method for producing a fermented milk capable of obtaining a fermented milk having a hard texture that can go through the distribution process while having a thick and mild taste which could not be achieved by a conventional production method, and a novel fermented milk obtained as a result of using the production method.

As described above, the method for producing a fermented milk of the present invention has an effect of bringing about improvement of the productivity by shortening the fermentation time without using any additive such as a fermentation accelerator when the fermentation temperature is within the usual temperature range, and when the fermentation temperature is lowered to below the usual temperature, the necessary acidity can be achieved within a fermentation time almost equal to the usual fermentation time. The fermented milk obtained in such a manner has a thick and mild taste superior to that of products obtained by conventional low-temperature and long-term fermentation, and further turns out to be a novel fermented milk maintaining a texture hardness which is never observed in any conventional products, thus the present invention has an effect of providing a fermented milk with novel values.

BEST MODE FOR CARRYING OUT THE INVENTION

The fermented milk according to the present invention means yogurt and "fermented milk" defined according to the Ministerial Ordinances concerning Compositional Standards etc. for Milk and Milk Products.

The present invention is achieved by reducing the dissolved oxygen concentration in the mix at the start of fermentation. As a method of reducing the dissolved oxygen concentration, a method such as membrane treatment or gas replacement is used appropriately. As the membrane treatment, for example, ultrafiltration (UF) membrane treatment, reverse osmosis (RO) membrane treatment and nanofiltration (NF) membrane (also referred to as loose RO membrane) treatment having an intermediate fractionation feature of both treatments are used alone or in combination of two or more of them. As the gas replacement, a method of replacing the dissolved oxygen with an inert gas such as nitrogen gas can be exemplified, however, hereinafter, the present invention will be explained by illustrating the method of replacement with an inert gas as a typical example in this description. In order to reduce the dissolved oxygen concentration at the start of fermentation, the treatment of replacement with an inert gas is carried out after preparing the mix, after sterilizing the mix or immediately after adding a lactic acid bacteria starter to the mix.

The mix can be obtained by heating and dissolving raw materials to be used regularly in the production of fermented milk, for example, a raw milk material such as milk, skim milk, powdery skim milk or cream, sugar, as a saccharide, a flavor, water and the like. In the case of using a stabilizer, a mix can be obtained by adding and mixing a gelatin solution, an agar solution, pectin, peroxidase or the like, which is preliminarily heated and dissolved. In the case of the present invention, when the fermentation time is merely shortened, it does not matter that a stabilizer such as gelatin is added, however, the above-mentioned stabilizer strongly affects the mildness, therefore, when mildness is pursued, it should not be added. Then, the obtained mix is homogenized and sterilized, and then cooled to a predetermined temperature (fermentation temperature). Subsequently, a lactic acid bacteria starter is inoculated and agitated, and then transferred into a tank for pre-fermentation to start fermentation, or packed into an individual container for distribution for post-fermentation to start fermentation. Further, a sugar solution or the like may be added to the mix after the completion of fermentation.

The treatment of replacement with an inert gas may be carried out at any time from the stage of blending the raw material mix to the initiation time of fermentation after the inoculation of the lactic acid bacteria starter, and the timing of replacement in the production process is optional. However, the replacement with an inert gas may preferably be carried out between the time immediately before the inoculation of the lactic acid bacteria starter and the time immediately after the inoculation thereof, because it is important that the conditions in which the dissolved oxygen concentration is reduced are maintained at the start of fermentation.

Further, as the dissolved oxygen concentration in the mix at the start of fermentation is lower, better results can be obtained, however, the concentration giving practically useful results is 5 ppm or less, preferably 3 ppm or less at a mix temperature ranging from 30° C. to 40° C. In this case, if the mix temperature is outside the above-mentioned range, evaluation may be made by converting the dissolved oxygen concentration to that in the case when the mix is placed in the above-mentioned conditions.

Examples of the inert gas to be used in the present invention include nitrogen gas, argon gas and helium gas. Nitrogen gas can be used more preferably as an inert gas which is generally used in foods. In order to reduce the dissolved oxygen in the mix, a known method such as a method of directly bubbling any of these inert gases into the mix, a method of using a static mixer or a method of introducing the inert gas together with the mix into a mixer and performing agitation may be used.

As the lactic acid bacteria starter to be inoculated into the mix, one or at least two species selected from *Lactobacillus bulgaricus* (*L. bulgaricus*), *Streptococcus thermophilus* (*S. thermophilus*) and *Lactobacillus lactis* (*L. lactis*) and other lactic acid bacteria and yeast to be generally used in the production of fermented milk may be used. In the present invention, a starter based on a mixed starter of *Lactobacillus bulgaricus* (*L. bulgaricus*) and *Streptococcus thermophilus* (*S. thermophilus*), which has been defined as a yogurt starter in the codex alimentarius can be preferably used. Further, depending on a fermented milk intended to be obtained, another lactic acid bacterium such as *Lactobacillus gasseri* (*L. gasseri*) or a bacterium belonging to the genus *Bifidobacterium* may be added using this yogurt starter as a base.

In addition, the fermentation temperature and the like may be appropriately determined in consideration of optimal conditions for each lactic acid bacterium, when emphasis is placed on the production efficiency. For example, the optimal temperature in the case of using the above-mentioned mixed starter is 40° C. to 44° C., however, fermentation time is prolonged at 40° C. in many cases, therefore, preferably it is 43° C. to 44° C. In this case, it is possible to shorten the fermentation time to about 80% to 70% of that of the usual case when the method of the present invention is used. This effect can be observed irrespective of any fermentation type of "pre-fermentation" and "post-fermentation". In other words, by carrying out the production in such a manner, it is possible in any fermentation type to shorten the fermentation time of fermented milk by adding a conventional amount of a conventional lactic acid bacteria starter without adding any lactic acid growth accelerator. Thus, it is possible to obtain a product which is the same as a product obtained by a conventional production method although the productivity is significantly improved.

On the other hand, in the case where a milder taste is intended to be given to a product than that of a standard product, low temperature conditions in the range from 30° C. to 40° C., preferably from 32° C. to 39° C., and more preferably from 36° C. to 39° C. may be selected as the fermentation temperature. In the case where the fermentation temperature is increased to 41° C. or higher, it is difficult to give mildness to a product, and thus, a product with a texture almost equal to that of a standard product will be produced.

The fermentation time varies depending on the dissolved oxygen concentration at the start of fermentation or the fermentation temperature, however, in the case of using the method of the present invention, when the dissolved oxygen concentration at the start of fermentation is 3 ppm or less, the acidity can reach the objective level at 34° C. to 35° C. in a fermentation time almost equal to that in the case where fermentation is carried out at a standard fermentation temperature by a conventional fermentation method. In the case where the fermentation temperature is decreased to 30° C., the fermentation time is prolonged compared with a usual method. However, even in this case, fermentation can be completed within a time of about 60% of the time when the method of the present invention is not carried out. Thus, the effect of the method of the present invention is apparent.

The fermented milk obtained under the low-temperature fermentation conditions of the present invention as described above can have excellent properties compared with the products obtained by the conventional methods, particularly when the fermented milk is produced as the post-fermentation type. That is, a fermented milk having a milder taste than a fermented milk produced at a standard fermentation temperature can be obtained. Moreover, a fermented milk having a thicker and milder taste than a fermented milk produced by conventional fermentation at a low temperature for a long time can be obtained. Furthermore, the fermented milk produced by fermentation at a low temperature of the present invention has a hard texture that does not collapse during the distribution stage, which could not be realized in a fermented milk produced by conventional fermentation at a low temperature for a long time. Thus, the fermented milk of the present invention is a novel and useful fermented milk with a hard texture while having an unprecedented mild taste.

In the case where the method of the present invention is applied to a pre-fermention type, because the pre-fermentation requires the step of crushing and packing the resulting curd, the final fermented milk does not have a hard texture. However, it is possible to obtain by roughly crushing the resulting curd or the like, a fermented milk with a thicker and milder taste than products produced by conventional fermentation at a low temperature for a long time in an organoleptic assessment. In addition, when the fermentation temperature for a pre-fermentation type is a standard temperature, it is needless to say that the effect of the present invention of shortening the fermentation time can be brought about.

Further, in the case of deoxygenated low-temperature fermentation, additional values resulting from physical properties different from those of conventional ones such as less occurrence of aqueous separation may possibly be given due to the difference in the pattern of the curd formation from that of the conventional products.

As for the mildness and the texture hardness of the fermented milk having both mildness and texture hardness of the present invention, values of such physical properties can be represented by the following values measured in accordance with the measurement manual for a neocurd meter M302 (I. Techno Engineering, the former name: Iio electric Co., Ltd.). That is, the "mildness" of the fermented milk in the method of the present invention can be evaluated by measuring the penetration angle of curd knife with a weight of 100 g at 5° C. to 10° C. Specifically, based on the measured curve represented by the bold line shown in FIG. 1, a tangent line (tangent line 1) going through the origin and directing to the breaking point and a tangent line (tangent line 2) going through the breaking point and going along the penetration direction of yogurt knife are drawn, and an angle (angle A) is measured using the point of intersection of two tangent lines as a base point, which is determined to be a penetration angle. In the case where this angle is close to 90°, it can be evaluated as a fermented milk with a rough texture, and as the angle is smaller, it can be evaluated as a fermented milk with a smooth texture.

The "hardness" in the method of the present invention is determined by the length B of the straight line connecting the point of intersection of the tangent line 1 and the tangent line 2 with the diagonal line on chart in FIG. 1 described above.

Hereinafter, the usefulness of the method of the present invention will be described in detail by showing the following test examples.

First, a test example is shown, in which the effect of the dissolved oxygen concentration in the mix on an increase in lactic acid acidity (effect on fermentation time) was examined.

Test Example 1

Relationship Between Dissolved Oxygen Concentration in the Mix at the Start of Fermentation and an Increase in Lactic Acid Acidity A mix was prepared by mixing 78.2 kg of milk, 2.6 kg of powdery skim milk and 17.2 kg of water. The mix was sterilized by heating at 95° C. for 5 minutes, and cooled to around 40° C. Subsequently, a lactic acid bacteria starter (a mixed culture of Lactobacillus bulgaricus (L. bulgaricus JCM 1002T) and Streptococcus thermophilus (S. thermophilus ATCC 19258)) was inoculated at a level of 2% by weight. Nitrogen gas was mixed and dispersed into the mix through a pipe to adjust a dissolved oxygen concentration to 7, 6, 5, 4, 3 or 2 ppm.

Then, each mix prepared to have each dissolved oxygen concentration was packed into a 100-ml container, and static fermentation was carried out in a fermentation chamber at around 40° C. At the time when the lactic acid acidity reached around 0.7%, the resulting product was placed in a refrigerator at 10° C. or lower for cooling and terminating the fermentation. For comparison, a fermentation product without adjusting the dissolved oxygen concentration was used. In this case, the dissolved oxygen concentration in the mix at the stage of the inoculation of the lactic acid bacteria starter was 8 ppm.

The results of the change of the lactic acid acidity during fermentation in the above Test example 1 are shown in FIG. 2. As is apparent from the results, the lower the dissolved oxygen concentration in the mix before fermentation is, the more the fermentation time is shortened. The shortening effect is evident when the dissolved oxygen concentration is 5 ppm or less, and when the dissolved oxygen concentration is 3 ppm or less, the difference from the conventional method (8 ppm) becomes more pronounced. Therefore, it is possible to conclude that the dissolved oxygen concentration in the mix during fermentation which is effective in shortening the fermentation time is 5 ppm or less, preferably 3 ppm or less.

Next, a test example is shown, in which the effect on the fermentation time in the case when the fermentation temperature is lowered to below the usual temperature and the properties of the product obtained at this time were examined.

Test Example 2

Relationship Among Fermentation Temperature, Fermentation Time and the Properties of the Resulting Fermented Milk in the Present Invention A mix was prepared by mixing 78.2 kg of milk, 2.6 kg of powdery skim milk and 17.2 kg of water. The mix was sterilized by heating at 95° C. for 5 minutes, and cooled to around 30, 35, 37, and 43° C. Subsequently, a lactic acid bacteria starter (a mixed culture of Lactobacillus bulgaricus (L. bulgaricus JCM 1002T) and Streptococcus thermophilus (S. thermophilus ATCC 19258)) was inoculated at a level of 2% by weight. Nitrogen gas was mixed and dispersed into the mix through a pipe to adjust a dissolved oxygen concentration to 3 ppm or less. As comparative examples, mixes obtained without performing replacement with nitrogen gas at each temperature were prepared. Then, the mixes were packed into 100-ml containers, respectively, and static fermentation was carried out in fermentation chambers at 30, 35, 37, 39, 40 and 43° C. At the time when the lactic acid acidity reached around 0.7%, the resulting products were placed in a refrigerator at 10° C. or lower for cooling and terminating the fermentation, whereby a fermented milk was produced. Incidentally, the lactic acid acidity was calculated by the titration with 0.1 N NaOH by using phenolphthalein as an indicator (the data for 39 and 40° C. were obtained additionally).

The results are shown in Table 1.

TABLE 1

Comparison of the values of the physical properties of fermented milks obtained by the method of the present invention and the conventional method with varying fermentation temperature and fermentation time

| Fermentation temperature (° C.) | Fermentation method | Fermentation time (time required for lactic acid acidity to reach 0.7%) | Hardness (curd tension) (g) | Penetration angle of curd knife (°) |
|---|---|---|---|---|
| 30 | Conventional | 9 h. 30 min. | 20 | 30 |
| 30 | Deoxygenation | 6 h. | 40 | 13 |
| 33 | Conventional | 6 h. | 25 | 32 |
| 33 | Deoxygenation | 4 h. | 50 | 14 |
| 35 | Conventional | 4 h. 15 min. | 25 | 33 |
| 35 | Deoxygenation | 3 h. 15 min. | 50 | 19 |
| 37 | Conventional | 3 h. 40 min. | 35 | 49 |
| 37 | Deoxygenation | 3 h. | 55 | 31 |
| 39 | Conventional | 3 h. 30 min. | 37 | 50 |
| 39 | Deoxygenation | 2 h. 50 min. | 60 | 33 |
| 40 | Conventional | 3 h. 20 min. | 40 | 50 |
| 40 | Deoxygenation | 2 h. 40 min. | 60 | 38 |
| 43 | Conventional | 3 h. | 60 | 50 |
| 43 | Deoxygenation | 2 h. 30 min. | 60 | 49 |

Measurement of the hardness (curd tension) of yogurt was carried out using a yogurt curd meter.
In order to maintain the shape of the curd during distribution, about 40 g of curd tension value is required.
As the smaller the value of the penetration angle of curd knife is, the smoother the texture of yogurt is.
Method of the present invention: Deoxygenation As is apparent from the results shown in Table 1, according to the method of the present invention, the fermentation time required for the lactic acid acidity to reach around 0.7% is significantly shortened compared with the case using the conventional method. Additionally, it is found that the plain yogurt obtained by the method of the present invention has a hardness sufficiently enduring impact during distribution (high hardness), which is indicated by the measured values of the physical properties, together with the smoothness (small penetration angle of yogurt knife), at a fermentation temperature of 40° C. or lower.

In addition, the results of an organoleptic assessment with the two-point intensity test using expert panelists, which was carried out for the fermented milk obtained by low-temperature fermentation at 37° C. in accordance with the method of the present invention and for the fermented milk obtained by the conventional method, are shown in Table 2.

TABLE 2

Results of organoleptic assessment with the two-point intensity test for the method of the present invention and the conventional method

| Item | P is smoother | Q is smoother | Unclear |
|---|---|---|---|
| Smooth texture on the tongue | 26 | 8 | 6 |

TABLE 2-continued

Results of organoleptic assessment with the two-point intensity test for the method of the present invention and the conventional method

| Item | P is milder | Q is milder | Unclear |
|---|---|---|---|
| Mild taste | 26 | 10 | 4 |

| Item | P has a richer taste | Q has a richer taste | Unclear |
|---|---|---|---|
| Rich taste (koku) | 20 | 10 | 10 |

| Item | P has a more acidic taste | Q has a more acidic taste | Unclear |
|---|---|---|---|
| Acidic level | 12 | 23 | 5 |

Number of test subjects: 40 persons
Results:
Significant difference was observed between the two samples concerning the above items.
Plain yogurt fermented at 37° C.
P: Deoxygenated low-temperature fermentation (method of the present invention)
Q: Low-temperature and long-term fermentation (conventional method)

As a result of the organoleptic assessment, it was found that the product of the present invention is superior to the fermented milk obtained by conventional low-temperature and long-term fermentation in terms of "smooth texture on the tongue", "mild taste" and "rich taste". In addition, it was found that the product of the present invention has a mild taste that allows the subjects to be less likely to feel an acidic taste, although the acidity thereof is almost the same as that of the product obtained by the conventional method.

Further, in order to observe how curd formation progressed in each production method, curd formation progression was compared among standard fermentation (43° C.), standard low-temperature fermentation (37° C.) and the low-temperature fermentation (37° C.) with a reduced dissolved oxygen concentration of the present invention, for both post-fermentation and pre-fermentation types. As a result, both the post-fermentation and the pre-fermentation gave almost the same results. FIG. 3 shows the results in the case of the post-fermentation.

Since curd formation starts after the lactic acid acidity reaches about 0.4%, it is assumed that the time required for curd formation is a time period from when the lactic acid acidity reaches 0.4% to when it reaches the objective acidity of 0.7%. FIG. 3 shows that in the case of using the method of the present invention, the start of curd formation occurs earlier although the whole fermentation takes a short fermentation time compared with the standard low-temperature fermentation. Thus, the time required for curd formation is the longest among the three examined methods. It is considered that this may be one of the causes of giving a thick and mild taste to the product.

Test Example 3

Measurement of Mildness and Hardness of Commercially Available Products

The penetration angle of curd knife and hardness of 4 types of commercially available plain yogurts were measured, and comparison thereof with those of the product fermented at 37° C. for 3 hours under deoxygenation conditions of the present invention was carried out. The obtained results are shown in Table 3.

Incidentally, as for the measurement of the physical properties of yogurt, a neocurd meter M302 (I. Techno Engineering, the former name: Iio electric Co., Ltd.) was used, and the penetration angle of yogurt knife with a weight of 100 g was measured. An elasticity until break of the obtained penetration angle curve was defined as a hardness (g), and the angle was used as an indicator of smoothness (the angle is a value up to 90°, and it can be determined that a smaller the value is, the smoother the texture is). When the hardness of yogurt measured with this measurement device is 40 g or more, it can be said that the texture is stable so that it does not collapse by the impact or the like during transportation.

TABLE 3

Relationship of mildness and hardness of commercially available products

| Commercially available products (plain yogurt) | (Mildness) Penetration angle of curd knife (°) | (Hardness) Curd tension (g) |
|---|---|---|
| A | 83 | 80 |
| B | 70 | 64 |
| C | 62 | 51 |
| D | 69 | 75 |
| Product of the present invention (product obtained at 37° C.) | 31 | 55 |

There was no product having both "mildness" and "hardness" as the product of the present invention among the commercially available products.

From the results of the above Test examples, it became evident that the method of the present invention has more excellent characteristic properties than the conventional production method.

Hereinafter, the method of the present invention will be described in more detail based on Examples. However, the invention is not limited to these Examples.

Example 1

Production of Pre-Fermentation Type Yogurt by Low-Temperature Fermentation

A mix was prepared by mixing 80.0 kg of milk, 3.1 kg of powdery skim milk, 1.1 kg of salt-free butter and 13.8 kg of water. The mix was sterilized by heating at 95° C. for 5 minutes and cooled to around 35° C. Subsequently, a lactic acid bacteria starter (a mixed culture of *Lactobacillus bulgaricus* (*L. bulgaricus* JCM 1002T) and *Streptococcus thermophilus* (*S. thermophilus* ATCC 19258)) was inoculated at a level of 2% by weight. Nitrogen gas was mixed and dispersed into the mix through a pipe to adjust a dissolved oxygen concentration to 3 ppm or less. Concurrently, a mix obtained without performing replacement with nitrogen gas was prepared. The amount of dissolved oxygen in each sample was measured by using a DO meter (manufactured by Toa DKK Co., Ltd.) and inserting the electrodes in each sample.

These samples were fermented in a tank around 35° C. until the lactic acid acidity reached around 0.7%. Then, the resulting curd was crushed and cooled to 10° C. or lower, for terminating the fermentation, whereby a fermented milk was produced. Lactic acid acidity determination was carried out by titration with 0.1 N NaOH by using phenolphthalein as an indicator followed by calculation. As a result, the acidity of 0.7% was achieved within 3 hours of fermentation time by the nitrogen-replaced low-temperature fermentation method of the present invention, while it took a fermentation time of 4.5 hours by the conventional low-temperature and long-term fermentation method.

Example 2

Production of Post-Fermentation Type Yogurt by Low-Temperature Fermentation

A mix was prepared by mixing 78.2 kg of milk, 2.6 kg of powdery skim milk and 17.2 kg of water. The mix was sterilized by heating at 95° C. for 5 minutes and cooled to around 37° C. Subsequently, a lactic acid bacteria starter (a mixed culture of *Lactobacillus bulgaricus* (*L. bulgaricus* JCM 1002T) and *Streptococcus thermophilus* (*S. thermophilus* ATCC 19258)) was inoculated at a level of 2% by weight. Nitrogen gas was mixed and dispersed into the mix through a pipe to adjust a dissolved oxygen concentration to 3 ppm or less. As a control, a mix obtained without performing replacement with nitrogen gas was prepared. Then, the mixes were packed into 100-ml containers, respectively, and static fermentation was carried out in a fermentation chamber at 37° C. At the time when the lactic acid acidity reached around 0.7%, the resulting products were placed in a refrigerator at 10° C. or lower for cooling and terminating the fermentation, whereby a fermented milk was produced.

Incidentally, the lactic acid acidity was obtained by titration with 0.1 N NaOH by using phenolphthalein as an indicator followed by calculation.

Additionally, as for the physical properties of yogurt, a neocurd meter M302 (I. Techno Engineering, the former name: Iio electric Co., Ltd.) was used, and the penetration angle of yogurt knife with a weight of 100 g was measured. An elasticity until break of the obtained penetration angle curve was defined as a hardness (g), and the angle was used as an indicator of smoothness (the angle is a value up to 90°, and it can be determined that a smaller the value is, the smoother the texture is). When the hardness of yogurt measured with this measurement device is 40 g or more, it can be said that the texture is stable so that it does not collapse by the impact or the like during transportation.

As a result, the hardness and the penetration angle according to the method of the present invention were 55 g and 30°, respectively, while the hardness and the penetration angle according to the conventional method were 35 g and 50°, respectively. Thus, it was confirmed that the fermented milk produced by the method of the present invention is smoother and has a hardness that allows the texture to be maintained at the distribution stage in view of the physical properties. Additionally, in terms of the actual taste, it was confirmed that the product of the present invention has a thicker and smoother taste than the conventional products.

Figure 1:
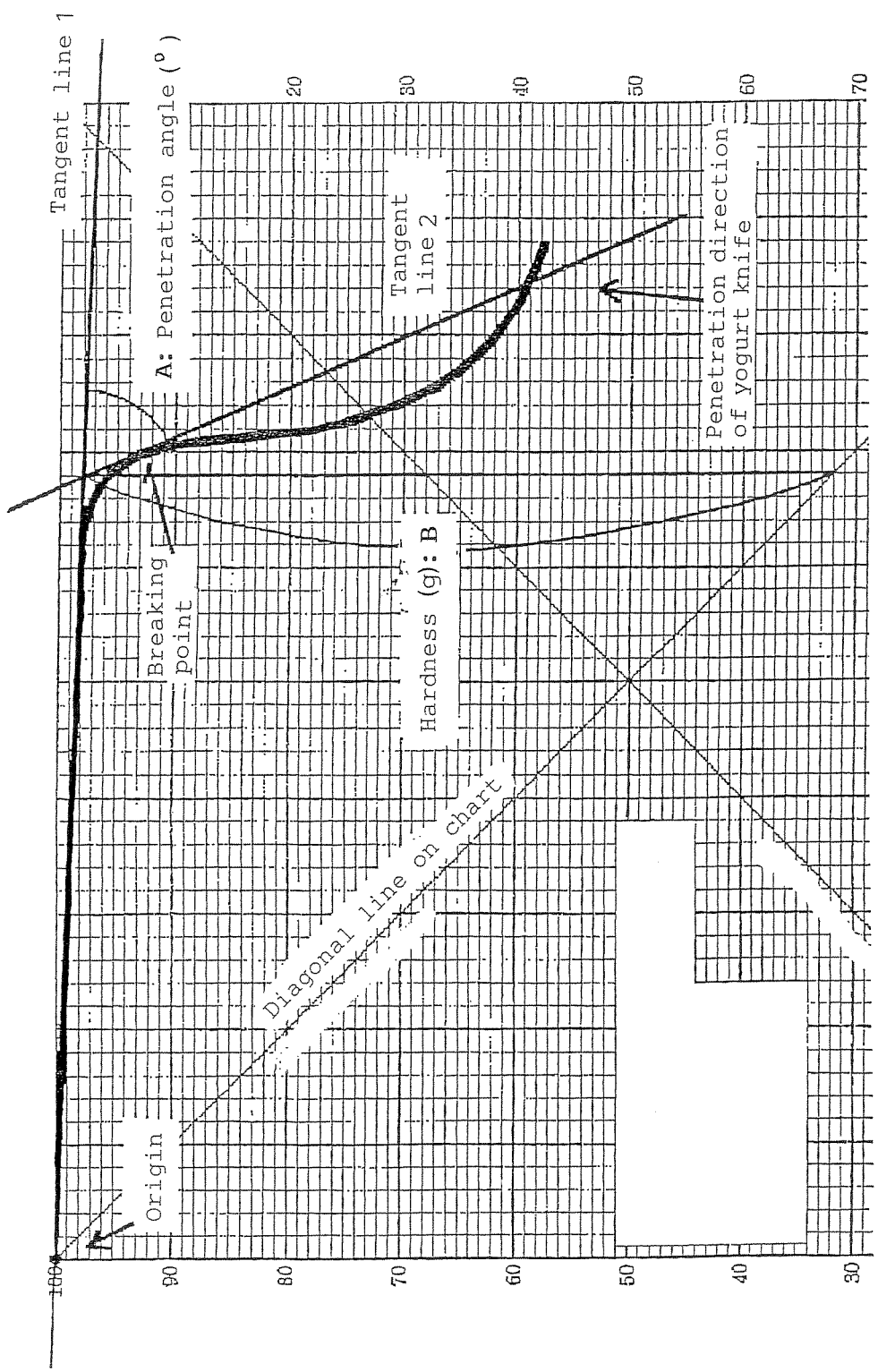
FIG. 1 is a graph showing a method of reading the penetration angle and the hardness from a chart measured using a curd meter.
Figure 2:
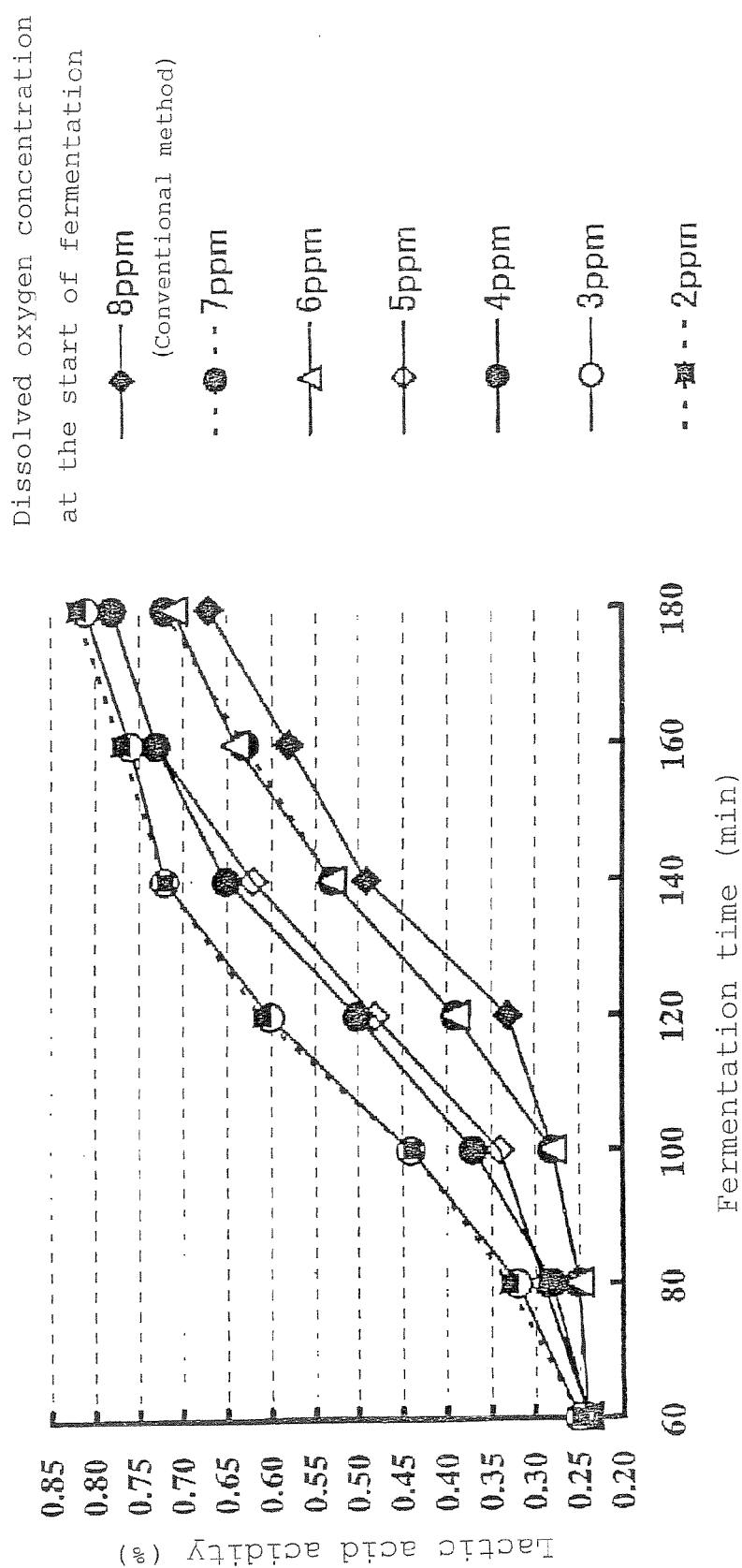
FIG. 2 is a graph showing the results of the effect of the dissolved oxygen in the raw material mix for the fermented milk on the fermentation time.
Figure 3:
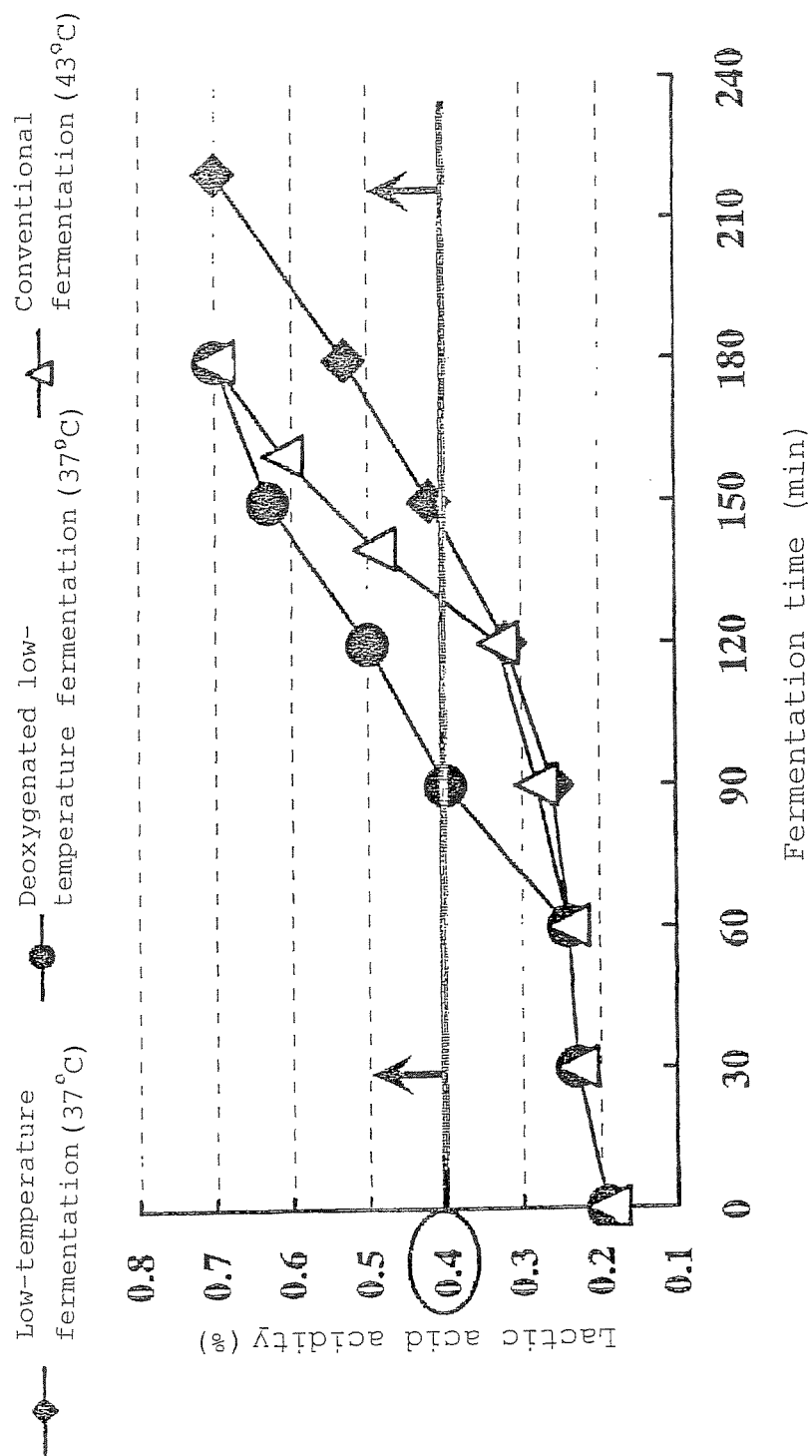
FIG. 3 is a graph showing the comparison of curd formation progression among the conventional method and the method of the present invention in low-temperature fermentation and fermentation at a standard temperature.

The invention claimed is:

1. A method for producing a fermented milk which comprises reducing the dissolved oxygen concentration in a raw material mix for the fermented milk at the start of fermentation to 3 ppm or less by replacing oxygen with nitrogen or argon gas and carrying out fermentation at a fermentation temperature of 30 to 40° C. without adding peroxidase.

2. A method for producing a fermented milk which comprises reducing the dissolved oxygen concentration in a raw material mix for the fermented milk at the start of fermentation to 2 to 3 ppm by replacement with nitrogen or argon gas and carrying out fermentation at a fermentation temperature of 30 to 40° C. without adding peroxidase.

3. A method for producing a fermented milk which comprises reducing the dissolved oxygen concentration in a raw material mix for the fermented milk at the start of fermentation to 2 to 3 ppm by replacement with nitrogen or argon gas and carrying out fermentation at a fermentation temperature of 30 to 40° C. without adding peroxidase for a time less than a fermentation process where the dissolved oxygen concentration is not reduced.

4. A fermented milk that does not contain peroxidase, shows 40 g or more hardness measured by a curd meter with a load of 100 g at a measurement temperature of 5 to 10° C., and shows 40° or less penetration angle of yogurt knife in said measurement.

5. A fermented milk that does not contain peroxidase, is obtained at a fermentation temperature of 30 to 40° C., shows 40 g or more hardness measured by a curd meter with a load of 100 g at a measurement temperature of 5 to 10° C., and shows 40 g or less penetration angle of yogurt knife in said measurement.

6. A fermented milk that does not contain peroxidase, is obtained by the method according to claim 1, shows 40 g or more hardness measured by a curd meter with a load of 100 g at a measurement temperature of 5 to 10° C., and shows 40 g or less penetration angle of yogurt knife in said measurement.

7. A fermented milk that does not contain peroxidase, is obtained by the method according to claim 2, shows 40 g or more hardness measured by a curd meter with a load of 100 g at a measurement temperature of 5 to 10° C., and shows 40 g or less penetration angle of yogurt knife in said measurement.

8. A fermented milk that does not contain peroxidase, is obtained by the method according to claim 3, shows 40 g or more hardness measured by a curd meter with a load of 100 g at a measurement temperature of 5 to 10° C., and shows 40 g or less penetration angle of yogurt knife in said measurement.

9. The method according to claim 1, wherein the raw material mix comprises a mixed starter of *Lactobacillus bulgaricus* and *Streptococcus thermophilus*.

10. The method according to claim 2, wherein the raw material mix comprises a mixed starter of *Lactobacillus bulgaricus* and *Streptococcus thermophilus*.

11. The method according to claim 3, wherein the raw material mix comprises a mixed starter of *Lactobacillus bulgaricus* and *Streptococcus thermophilus*.

12. The fermented milk according to claim 4 produced by fermenting a raw material mix comprising a mixed starter of *Lactobacillus bulgaricus* and *Streptococcus thermophilus*.

13. The fermented milk according to claim 5 produced by fermenting a raw material mix comprising a mixed starter of *Lactobacillus bulgaricus* and *Streptococcus thermophilus*.

14. The fermented milk according to claim 6 produced by fermenting a raw material mix comprising a mixed starter of *Lactobacillus bulgaricus* and *Streptococcus thermophilus*.

15. The fermented milk according to claim 7 produced by fermenting a raw material mix comprising a mixed starter of *Lactobacillus bulgaricus* and *Streptococcus thermophilus*.

16. The fermented milk according to claim 8 produced by fermenting a raw material mix comprising a mixed starter of *Lactobacillus bulgaricus* and *Streptococcus thermophilus*.

17. The method according to claim 2, which comprises replacement with nitrogen gas.

18. The method according to claim 3, which comprises replacement with nitrogen gas.

19. The method according to claim 1, wherein the fermentation temperature is from 38 to 40° C.

20. The method according to claim 2, wherein the fermentation temperature is from 38 to 40° C.

21. The method according to claim 3, wherein the fermentation temperature is from 38 to 40° C.

* * * * *